March 10, 1931. C. R. BEALL 1,795,420

SELECTIVE LOCKING APPARATUS

Filed April 24, 1928

INVENTOR:
C. R. Beall,
by A. R. Vercill,
His Attorney.

Patented Mar. 10, 1931

1,795,420

UNITED STATES PATENT OFFICE

CHARLES R. BEALL, OF EDGEWOOD BOROUGH, PENNSYLVANIA, ASSIGNOR TO THE UNION SWITCH & SIGNAL COMPANY, OF SWISSVALE, PENNSYLVANIA, A CORPORATION OF PENNSYLVANIA

SELECTIVE LOCKING APPARATUS

Application filed April 24, 1928. Serial No. 272,438.

My invention relates to selective locking apparatus, and particularly to apparatus of the type involving a device moved between two extreme positions by a plurality of rotations of a shaft. One object of my invention is the provision of means for locking such device in either extreme position by locking the shaft which moves it, but for preventing the shaft from being locked when the device is in any intermediate position.

I will describe several forms of apparatus embodying my invention, and will then point out the novel features thereof in claims.

Figure 1:
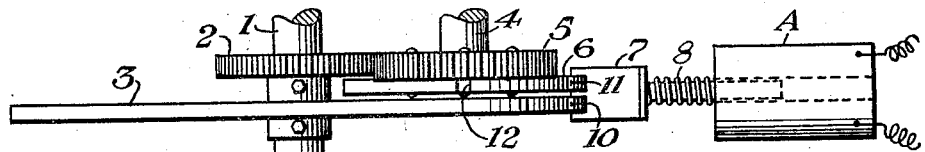
Figure 2:
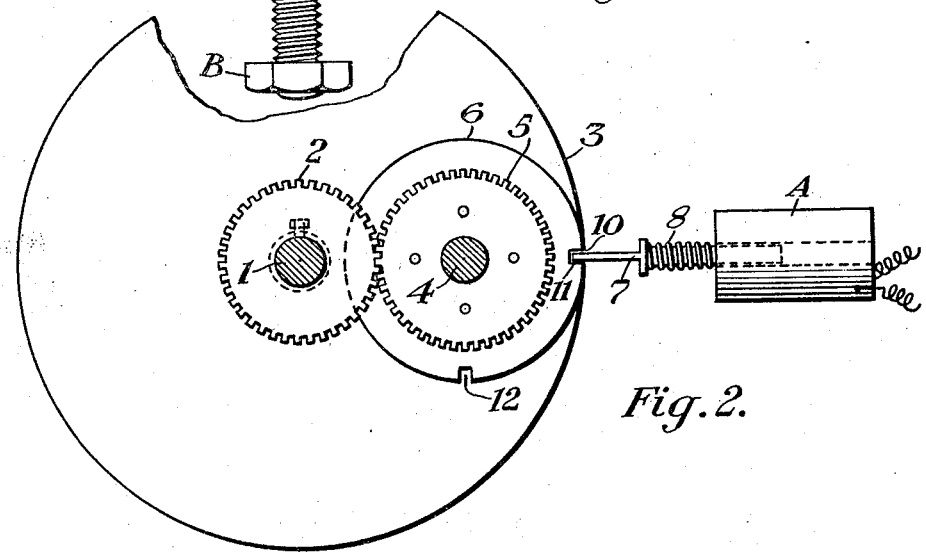
Figure 3:
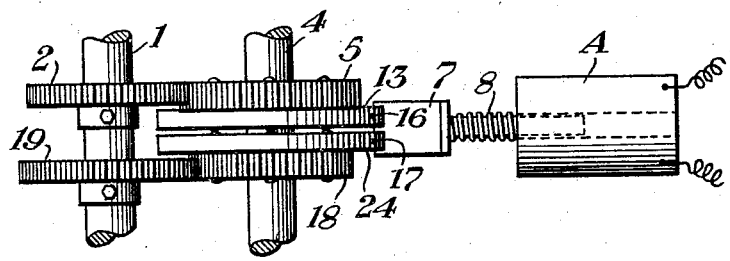
Figure 4:
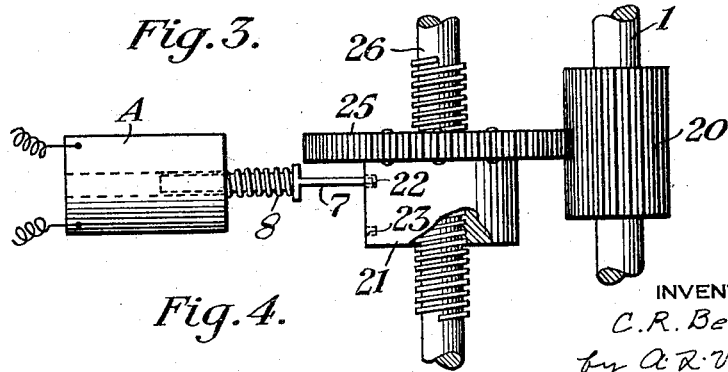

In the accompanying drawing, Fig. 1 is a view showing one form of apparatus embodying my invention. Fig. 2 is a top view of the apparatus shown in Fig. 1. Figs. 3 and 4 are views showing modified forms of the apparatus illustrated in Figs. 1 and 2, and also embodying my invention.

Similar reference characters refer to similar parts in each of the several views.

Referring first to Figs. 1 and 2, the reference character 1 designates a portion of a rotatable shaft which operates a device between two extreme positions. As here shown, the device is a nut B threaded upon the shaft so that by rotation of the shaft the nut may be moved from the position in which it is illustrated in full lines in the drawing to the position indicated by the dotted lines at B¹. The nut B may be connected with other apparatus not shown in the drawing, such for example, as an electric oil switch or a disconnecting switch having extreme positions corresponding to the extreme positions of nut B. In apparatus of the type suggested it is desirable to lock the nut in either extreme position to prevent accidental or malicious displacement of the apparatus connected therewith. I prefer to accomplish this result by locking the shaft 1 which drives the nut B. For this purpose I attach to the shaft 1 a pinion 2 and a circular locking plate 3. Meshing with the pinion 2 is a gear wheel 5 which is journalled on the shaft 4, and to which is attached a second circular locking plate 6. It follows, therefore, that when shaft 1 is rotated, the locking plates 3 and 6 are both rotated, but as here shown these two plates rotate in opposite directions and turn through different angles for a given angular movement of the shaft.

Co-operating with the locking plates 3 and 6 is a locking plunger 7, which is constantly urged toward the peripheries of the plates by a spring 8. The plunger 7 is controlled by a magnet A, which is arranged when energized to move the plunger away from the locking plates against the bias of spring 8. The supply of current to magnet A may be controlled by any suitable means not shown in the drawing.

The locking plate 3 is provided at its periphery with a notch 10, and the locking plate 6 is provided with two spaced notches 11 and 12. The various parts are so proportioned and disposed that when the nut B is in one extreme position, in which it is illustrated in the drawing, notch 10 in plate 3 and notch 11 in plate 6 are in alignment. If magnet A is then de-energized, spring 8 urges the plunger into notches 10 and 11 to lock the plates, and hence the shaft 1 and the nut B, in the positions which these parts then occupy. The apparatus may be unlocked by energizing magnet A to withdraw plunger 7 from notches 10 and 11. The shaft may then be rotated to move the nut B to its other extreme position, whereupon notch 10 in plate 3 and notch 12 in plate 6 become aligned, and if the magnet A is then de-energized, the plunger enters these notches to lock the parts in position. When the nut B is in any position intermediate its extreme positions, however, the plunger 7 bears against the periphery of at least one of the locking plates, and so is prevented from entering a notch to lock the apparatus, even though the magnet A is de-energized.

By properly choosing the gear ratio between pinion 2 and gear wheel 5 and the locations of the locking notches, the apparatus may be designed to lock the nut B in any two positions.

In the modified form of apparatus shown in Fig. 3, the shaft 1 carries two gear wheels 2 and 19, of different sizes, which drive two other gear wheels 5 and 18, respectively. Gear wheels 5 and 18 are journalled on the fixed shaft 4. Attached to gear wheel 5 is a circular locking plate 13 which is provided at its periphery with a notch 16. A similar locking plate 24 is attached to the gear wheel 18 and is provided with a notch 17.

The parts are so proportioned that when the nut driven by shaft 1 occupies one extreme position, the locking plunger 7 enters notches 16 and 17 to lock the parts in position. If the plunger is withdrawn and the shaft 1 rotated, the locking plates will rotate at different speeds until the plates 13 and 24 again occupy positions in which notches 16 and 17 receive plunger 7. The gear ratios of gear wheels 2 and 5 and of gear wheels 19 and 18, and the dimensions of the plates 13 and 24 are so chosen that this second locking position corresponds to the other extreme position of the nut B. It will be seen that for all positions of the nut between its two extreme positions, the plunger rides on the periphery of at least one of the locking plates so that the parts can be locked only when nut B occupies an extreme position.

Referring now to Fig. 4, the shaft 1 carries a broad faced pinion 20, which is rigidly attached to the shaft. The pinion 20 meshes with a gear wheel 25, which is attached to a locking drum 21 provided with spaced holes 22 and 23 and threaded on a fixed spindle 26. When shaft 1 is rotated, pinion 20 drives gear wheel 25, which travels upwardly or downwardly on the spindle 26 depending upon the direction of rotation of the shaft. When the nut B, driven by shaft 1, occupies either extreme position, one of the holes 22 or 23 in drum 21 is opposite plunger 17 so that if magnet A is de-energized the plunger enters the hole to lock the parts in position. When the nut is in an intermediate position, however, the plunger bears against the surface of the drum 21 and can not lock the parts.

It will be clear from the foregoing that I have devised several forms of apparatus for locking in either of two extreme positions a device driven by a shaft which performs a plurality of rotations in moving the device between such positions. Furthermore, the apparatus is ineffective to lock the parts when the device occupies any intermediate position.

Although I have herein shown and described only a few forms of selective locking apparatus embodying my invention, it is understood that various changes and modifications may be made therein within the scope of the appended claims without departing from the spirit and scope of my invention.

Having thus described my invention, what I claim is:

1. In combination, a rotatable shaft, two circular locking plates, means for rotating the plates at different angular velocities in response to rotation of the shaft, and means for locking the plates when and only when they have either of two predetermined relative positions.

2. In combination, a rotatable shaft, a device movable between two extreme positions by a plurality of rotations of said shaft, a locking plate driven by said shaft, means for locking said plate when said device occupies either of said extreme positions, and means driven by said shaft for rendering said locking means ineffective when the device occupies any intermediate position.

3. In combination, a rotatable shaft, a device movable between two extreme positions by a plurality of rotations of said shaft, two circular locking plates driven by said shaft and arranged to turn through different angles for a given angular movement of said shaft, a locking plunger bearing against the edges of both said plates, and notches in said plates to receive said plunger and lock the plates when and only when said device occupies one of its extreme positions.

4. Selective locking apparatus comprising a rotatable shaft, two circular locking plates each provided at its periphery with a notch, means for rotating said plates at different rates in response to rotation of said shaft, and a locking plunger for entering said notches when both notches are aligned with said plunger simultaneously.

5. In combination, a rotatable shaft, a device movable between two extreme positions by a plurality of rotations of said shaft, a first locking plate attached to said shaft, a second locking plate geared to said shaft, and means for locking both said plates when and only when said device occupies either of said extreme positions.

6. In combination, a rotatable shaft, a device movable between two extreme positions by a plurality of rotations of said shaft, a first and a second gear wheels rigidly attached to said shaft, two other gear wheels meshing with said first and second gear wheels, respectively, two locking plates one driven by each of said two other gear wheels, and means for locking said locking plates when and only when said device occupies either of its extreme positions.

In testimony whereof I affix my signature.

CHARLES R. BEALL.